(12) United States Patent
Sasaki et al.

(10) Patent No.: US 10,649,246 B2
(45) Date of Patent: May 12, 2020

(54) DIELECTRIC THIN FILM-APPLIED SUBSTRATE AND OPTICAL MODULATION ELEMENT USING THE SAME

(71) Applicant: TDK CORPORATION, Tokyo (JP)

(72) Inventors: Kenji Sasaki, Tokyo (JP); Shinji Iwatsuka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/318,058

(22) PCT Filed: Jul. 14, 2017

(86) PCT No.: PCT/JP2017/025662
§ 371 (c)(1),
(2) Date: Jan. 15, 2019

(87) PCT Pub. No.: WO2018/016428
PCT Pub. Date: Jan. 25, 2018

(65) Prior Publication Data
US 2019/0293972 A1 Sep. 26, 2019

(30) Foreign Application Priority Data
Jul. 19, 2016 (JP) .................................. 2016-141619

(51) Int. Cl.
| | | |
|---|---|---|
| *G02F 1/035* | (2006.01) | |
| *G02B 6/12* | (2006.01) | |
| *G02F 1/03* | (2006.01) | |
| *G02F 1/225* | (2006.01) | |
| *G02B 5/30* | (2006.01) | |
| *G02B 6/122* | (2006.01) | |

(52) U.S. Cl.
CPC .............. *G02F 1/035* (2013.01); *G02B 5/30* (2013.01); *G02B 6/12* (2013.01); *G02B 6/122* (2013.01);
(Continued)

(58) Field of Classification Search
CPC ........ G02F 1/035; G02F 1/0316; G02F 1/225; G02F 2201/07; G02F 2202/20; G02B 5/30; G02B 6/122
See application file for complete search history.

(56) References Cited

U.S. PATENT DOCUMENTS

2015/0138619 A1* 5/2015 Iwatsuka ............... G02F 1/0316
359/245

FOREIGN PATENT DOCUMENTS

| JP | 2006195383 A | 7/2006 |
|---|---|---|
| JP | 2013173647 A | 9/2013 |

(Continued)

OTHER PUBLICATIONS

J. Appl. Phys., vol. 90, No. 10, Nov. 15, 2001 LiNbO3 thick films grown on sapphire by using a multistep sputtering process.
(Continued)

*Primary Examiner* — Ryan A Lepisto
(74) *Attorney, Agent, or Firm* — Young Law Firm, P.C.

(57) ABSTRACT

A dielectric thin film-applied substrate that suppresses occurrence of cracks when the film thickness of the lithium niobate film is equal to or larger than 1 μm. The dielectric thin film-applied substrate includes a single crystal substrate and a dielectric thin film made of c-axis oriented lithium niobate epitaxially formed on a main surface of the single crystal substrate. The dielectric thin film has a twin crystal structure including first and second crystals 180° apart, centered on the c-axis. In pole figure measurement by X-ray diffraction, the ratio between a first diffraction intensity corresponding to the first crystal and a second diffraction intensity corresponding to the second crystal is equal to or higher than 0.5 and equal to or lower than 2.0, which alleviates distortions accumulated inside the lithium niobate (Continued)

film and supresses occurrences of cracks accompanying increases in the film thickness.

9 Claims, 14 Drawing Sheets

(52) U.S. Cl.
CPC .............. *G02F 1/03* (2013.01); *G02F 1/0316* (2013.01); *G02F 1/225* (2013.01); *G02F 2201/07* (2013.01); *G02F 2202/20* (2013.01)

(56) References Cited

FOREIGN PATENT DOCUMENTS

| JP | 2014006348 A | 1/2014 |
|---|---|---|
| JP | 2014106397 A | 6/2014 |
| JP | 2015014716 A | 1/2015 |
| JP | 2015118371 A | 6/2015 |
| JP | 2015230466 A | 12/2015 |
| JP | 2015232631 A | 12/2015 |

OTHER PUBLICATIONS

Jpn. J. Appl. Phys. vol. 41 (2002) pp. L275-L277 Preparation of Twin- and Crack-Free LiNbO3 Films by Pulsed Laser Using Nucleation Process at High Temperature Ablation.

Bartasyte,A. et al., Residual stresses and clamped thermal expansion in LiNb03 and LiTa03 thin films, Applied Physics Letters, 2012, 101, 122902-1-122902-5.

International Search Report dated Sep. 22, 2017 in PCT/JP2017/025662.

* cited by examiner

|  |  | Sample A | Sample B | Sample C |
|---|---|---|---|---|
| Ratio between Diffraction Intensities | | 0.99 | 0.45 | 0.20 |
| Film Thickness | 700nm | 0 (0%) | 0 (0%) | 5 (38%) |
| | 900nm | — | 0 (0%) | 9 (69%) |
| | 1100nm | 0 (0%) | 5 (38%) | 13 (100%) |
| | 1300nm | — | 9 (69%) | 13 (100%) |
| | 1500nm | 0 (0%) | 9 (69%) | — |
| | 1700nm | — | 13 (100%) | — |
| | 1900nm | 0 (0%) | 13 (100%) | — |

FIG.15

DIELECTRIC THIN FILM-APPLIED SUBSTRATE AND OPTICAL MODULATION ELEMENT USING THE SAME

TECHNICAL FIELD

The present invention relates to a dielectric thin film-applied substrate capable of being used for an optical modulation element and an optical waveguide. The present invention also relates to an optical modulation element using the dielectric thin film-applied substrate.

BACKGROUND ART

As the use of the Internet spreads, the amount of data communicated is rapidly increasing, making the optical fiber communication very important. In the optical fiber communication, electric signals are converted into optical signals, and the optical signals are transmitted through optical fibers. The optical fiber communication is characterized in that the signals are transmitted in the broad band, with a small loss, and are not affected by noise.

Known as systems for converting electric signals into optical signals are the direct modulation system using a semiconductor laser and the external modulation system using optical modulators. The direct modulation system need not use the optical modulators and its running cost is low, but cannot achieve high-speed modulation. This is why the external modulation system is used in high-speed and long-distance data communication.

Optical modulators in which an optical waveguide is formed by Ti (titanium) diffusion in the vicinity of a surface of a lithium niobate single crystal substrate have been practically used. Although high-speed optical modulators having a modulation speed of 40 Gb/s or more are commercially available, they have a major drawback that the entire length thereof is as long as about 10 cm.

On the other hand, Patent Documents 1 to 4 disclose a Mach-Zehnder optical modulator using a ridge type optical waveguide obtained by processing a c-axis oriented lithium niobate film formed by epitaxial growth on a sapphire single crystal substrate into a ridge type. The optical modulator using the lithium niobate film achieves a significant reduction in size and driving voltage as compared with the optical modulator using the lithium niobate single crystal substrate.

CITATION LIST

Patent Document

[Patent Document 1] Japanese Patent Application Laid-Open No. 2014-006348
[Patent Document 2] Japanese Patent Application Laid-Open No. 2015-014716
[Patent Document 3] Japanese Patent Application Laid-Open No. 2015-118371
[Patent Document 4] Japanese Patent Application Laid-Open No. 2015-230466

Non-Patent Document

[Non-Patent Document 1] J. Appl. Phys., Vol. 90, No. 10, 15 Nov. 2001 $LiNbO_3$ thick films grown on sapphire by using a multistep sputtering process
[Non-Patent Document 2] Jpn. J. Appl. Phys. Vol. 41 (2002) pp. L275-L277 Preparation of Twin- and Crack-Free $LiNbO_3$ Films by Pulsed Laser Ablation Using Nucleation Process at High Temperature

SUMMARY OF THE INVENTION

Problem to be Solved by the Invention

However, as reported in Non-Patent Documents 1 and 2, it is not easy to form a lithium niobate film having a sufficient film thickness on the sapphire single crystal substrate and, when the lithium niobate film is formed to have a thickness of about several hundred nm, cracks may occur in the lithium niobate film in some conditions.

An object of the present invention is therefore to provide a dielectric thin film-applied substrate in which a lithium niobate film is formed on a single crystal substrate, capable of suppressing occurrence of cracks even when the film thickness of the lithium niobate film is made, e.g., equal to or larger than 1 μm.

Another object of the present invention is to provide an optical modulation element using the dielectric thin film-applied substrate.

Means for Solving the Problem

Intensive studies made by the present inventors revealed that there was a connection between occurrence of the cracks in the lithium niobate film and a twin crystal structure of lithium niobate. Specifically, when the mixing ratio between two kinds of crystals constituting a twin crystal significantly deviates from 1:1, distortion accumulated inside the lithium niobate film is not alleviated, with the result that significant cracks occur with increase in the film thickness.

The present invention has been made based on the above technical findings, and a dielectric thin film-applied substrate according to the present invention includes a single crystal substrate and a dielectric thin film which is made of c-axis oriented lithium niobate and epitaxially formed on a main surface of the single crystal substrate. The film thickness of the dielectric thin film is equal to or larger than 1000 nm, and the dielectric thin film has a twin crystal structure including a first crystal and a second crystal existing at a position obtained by rotating the first crystal 180° centered on the c-axis. In pole figure measurement by an X-ray diffraction method, the ratio between a first diffraction intensity corresponding to the first crystal and a second diffraction intensity corresponding to the second crystal is equal to or higher than 0.5 and equal to or lower than 2.0.

Further, an optical modulation element according to the present invention uses the thus configured dielectric thin film-applied substrate.

According to the present invention, the ratio between the first diffraction intensity corresponding to the first crystal and the second diffraction intensity corresponding to the second crystal is equal to or higher than 0.5 and equal to or lower than 2.0, which means balance between the two kinds of crystals constituting the twin crystal structure is ensured, so that distortion accumulated inside the lithium niobate film is easily alleviated. Thus, it is possible to suppress occurrences of cracks accompanying increases in the film thickness. In the present invention, as the single crystal substrate, a sapphire single crystal substrate whose main surface is a c-surface can be used. This can reduce the percentage of regions where a crack having a length of 10 μm or larger is present to 30% or less.

In the present invention, in the pole figure measurement by the X-ray diffraction method, the ratio between the first diffraction intensity and the second diffraction intensity is preferably equal to or higher than 0.8 and equal to or lower than 1.25, which means the mixing ratio between the two kinds of crystals constituting the twin crystal structure is substantially 1:1, allowing highly stable dielectric thin film to be obtained. Thus, even when the film thickness of the lithium niobate film is set to e.g., 1300 nm or larger, a crack-free film can be realized.

In the present invention, the full width at half maximum of the rocking curve of lithium niobate (006) reflection measured by the X-ray diffraction method is preferably equal to or higher than 0.3° and equal to or lower than 0.6°. This can prevent occurrence of cracks more effectively than when the first and second crystals are each close to the single crystal structure.

In the present invention, it is preferable that a grain boundary does not exist between the first and second crystals. This prevents light scattering due to the presence of the grain boundary from occurring, making it possible to reduce propagation loss.

Advantageous Effects of Invention

According to the present invention, there can be provided a dielectric thin film-applied substrate having thick and crack-free lithium niobate film and an optical modulation element using the dielectric thin film-applied substrate.

BRIEF DESCRIPTION OF DRAWINGS

FIGS. 6A and 6B are plan views each illustrating a Mach-Zehnder optical modulation element 200B using the dielectric thin film-applied substrate 1, wherein FIG. 6A illustrates only the optical waveguides, and FIG. 6B illustrates the entire configuration of the optical modulation element 200B including the traveling-wave electrode.

FIGS. 8A and 8B are plan views each illustrating a Mach-Zehnder optical modulation element 200C using the dielectric thin film-applied substrate 1, wherein FIG. 8A illustrates only the optical waveguides, and FIG. 8B illustrates the entire configuration of the optical modulation element 200C including the traveling-wave electrode.

FIGS. 9A and 9B are views illustrating the results of the pole figure measurement by the X-ray diffraction method, wherein FIG. 9A is the result obtained in a comparative example, and FIG. 9B is the result obtained in the example.

FIG. 15 is a table illustrating the results of Example 3.

MODE FOR CARRYING OUT THE INVENTION

Hereinafter, a preferred embodiment of the present invention will be described with reference to the accompanying drawings. The subject matter of the present invention is not limited to the following embodiment. Further, it should be noted that constituent elements described herein may be replaced with other components that are obvious to those skilled in the art and are substantially the same. Further, the constituent elements described below may be combined on an optional basis. Further, the accompanying drawings are exemplary, and the relationship between the thickness and planar size is allowed to differ for descriptive convenience from that in the actual structure within a range to obtain the effect of the present invention.

Figure 1:
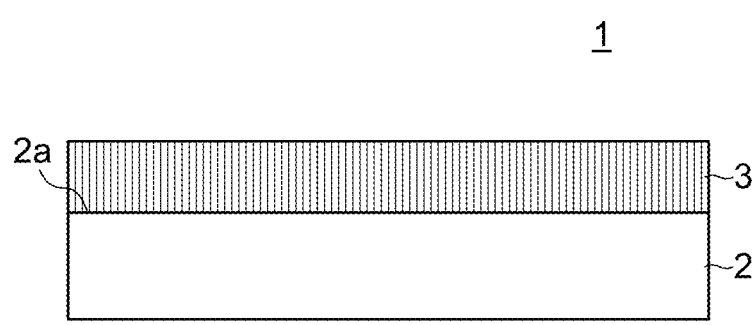
FIG. 1 is a schematic cross-sectional view illustrating the structure of a dielectric thin film-applied substrate 1 according to an embodiment of the present invention.

FIG. 1 is a schematic cross-sectional view illustrating the structure of a dielectric thin film-applied substrate 1 according to an embodiment of the present invention.

As illustrated in FIG. 1, the dielectric thin film-applied substrate 1 according to the present embodiment includes a single crystal substrate 2 and a dielectric thin film 3 made of lithium niobate epitaxially formed on a main surface 2a of the single crystal substrate 2.

Although the single crystal substrate 2 is not particularly limited in material as long as it is a lower refractive index than lithium niobate, the substrate 2 must be a substrate on which the lithium niobate film can be formed as an epitaxial film. Specifically, the single crystal substrate 2 is preferably a sapphire single crystal substrate or a silicon single crystal substrate and is particularly preferably a sapphire single crystal substrate. The lithium niobate film can be easily formed as a c-axis oriented epitaxial film on single crystal substrates of various crystal orientations, so that the crystal orientation of the single crystal substrate is not particularly limited. Since the c-axis oriented lithium niobate film has three-fold symmetry, the underlying single crystal substrate 2 preferably has the same symmetry. Thus, when the sapphire single crystal substrate is used as the single crystal substrate 2, it preferably has a c-plane as the main surface 2a, and when the silicon single crystal substrate is used as the single crystal substrate 2, it preferably has a (111) surface as the main surface 2a.

The dielectric thin film 3 is composed mainly of c-axis oriented lithium niobate ($LiNbO_3$) epitaxially formed on the main surface 2a of the single crystal substrate 2. Lithium niobate has a large electro-optic constant and is thus suitable as a constituent material for an optical device such as an optical modulator. The lithium niobate film has a composition of $Li_xNbA_yO_z$. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

The lithium niobate film constituting the dielectric thin film 3 is preferably a single-phase $LiNbO_3$ film. That is, the lithium niobate film should preferably not include a different phase such as $LiNb_3O_8$ or $Li_3NbO_4$.

The thickness of the dielectric thin film 3 must be equal to or larger than 1 μm and is preferably equal to or smaller than 2 μm. This is because of the following reasons. That is, the dielectric thin film-applied substrate 1 according to the present embodiment is most suitably applied to an optical modulation element and, in this case, the dielectric thin film 3 needs to have a thickness of equal to or larger than 1 μm in order to sufficiently reduce VπL. On the other hand, when the thickness of the dielectric thin film 3 exceeds 2 μm, it is highly possible that cracks may occur due to a difference in thermal expansion coefficient or mismatching of a lattice constant between the dielectric thin film 3 and the single crystal substrate 2 which is the sapphire single crystal substrate or the like. Further, even when the film thickness of the dielectric thin film 3 is made still larger, the VπL is hardly reduced.

The dielectric thin film 3 is an epitaxial film formed by epitaxial growth on the main surface 2a of the single crystal substrate 2. The epitaxial film refers to a film having the crystal orientation of the underlying substrate or film. When the film in-plane surface is defined as an X-Y plane, and the film thickness direction is as a Z-axis, the crystal is typically uniformly oriented along the X-, Y-, and Z-axes. For example, the presence of an epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target plane must be 10% or less, preferably 5% or less, of the maximum peak intensity on the target plane. For example, in a c-axis oriented epitaxial lithium niobate film, the peak intensities except for the peak intensity on a (00L) surface are 10% or less, preferably equal to or less than 5% or less, of the maximum peak intensity on the (00L) surface. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of the in-plane crystalline orientation being non-uniform, the X-ray intensity is not increased at a particular angle, and poles cannot be observed. Since $LiNbO_3$ has a trigonal crystal system, single crystal $LiNbO_3$ (014) has three poles. For the lithium niobate film, it is known that crystals rotated by 180° about the c-axis are epitaxially grown in a symmetrically-coupled twin crystal state. In this case, the three poles are symmetrically-coupled to form six poles.

The c-axis of the dielectric thin film 3 preferably coincides with the c-axis of the single crystal substrate 2, and the deviation between them preferably falls within 5°. When the deviation between them falls within 5°, no practical problem occurs when the dielectric thin film-applied substrate is used for an optical modulation element.

The lithium niobate film constituting the dielectric thin film 3 has a twin crystal structure including a first crystal and a second crystal existing at a position obtained by rotating the first crystal 180° centered on the c-axis. The first crystal refers to a crystal having the same in-plane direction as the single crystal substrate 2 which is the underlying substrate, while the second crystal refers to a crystal having an in-plane direction rotated by 180° with respect to the in-plane direction of the single crystal substrate 2 which is the underplaying substrate. The closer the ratio between the first and second crystals (A:B) is to 1:1, the better, and A:B=1:2 to 2:1 is preferably satisfied. In other words, the ratio of one crystal (e.g., second crystal) to the other crystal (e.g., first crystal) preferably falls within the range of 0.5 to 2. More specifically, the ratio of a crystal with smaller content to a crystal with larger content preferably falls within the range of 0.5 to 1.0.

It has been conventionally considered that the lithium niobate film used for an optical modulating element preferably have a structure in which the twin crystal ratio is almost 0 or infinite, that is, the closer the structure of the lithium niobate film is to a single crystal structure, the better. However, it is difficult to form a perfect single crystal structure without the twin crystal structure and, even if a film having a structure close to the single crystal structure can be realized, a crack-free film having a film thickness of 1 μm or greater cannot be realized. According to the studies made by the present inventors, stress is alleviated more to make the entire film more stable when the ratios of two crystals are made as equal possible than when the ratio of one of the two crystals is increased to bring the structure of the film close to the single crystal structure as much as possible. Based on the above finding, the ratio (A:B) between the first and second crystals is made to fall within the above range in the present embodiment. Thus, when the lithium niobate film is divided into a plurality of areas in a plan view, the ratio of an area where a crack having a length of 10 μm or greater exists can be reduced to 30% or less of the total area.

The reason that the ratio between the first and second crystals has on the occurrence of cracks is not clear; however, it can be estimated as follows. That is, the sapphire and lithium niobate differ from each other in lattice constant or thermal expansion coefficient to make distortion likely to occur, so that when the lithium niobate film has a structure close to the single crystal structure, it is difficult to alleviate the distortion to make the cracks likely to occur. On the other hand, when the two crystals are mixed substantially evenly in the twin crystal structure, effect to alleviate the distortion can be obtained to thereby suppress the occurrence of cracks.

The ratio between the first and second crystals can be confirmed by pole figure measurement by an X-ray diffraction method. When the ratio between a first diffraction intensity corresponding to the first crystal and a second diffraction intensity corresponding to the second crystal is calculated, the ratio between the first and second crystals is determined. Thus, when the ratio between the first diffraction intensity and the second diffraction intensity falls within the range of 0.5 to 2.0, it can be seen that the ratio (A:B) between the first and second crystals falls within the above range.

Although the ratio (A:B) between the first and second crystals is preferably 1:1, it is difficult to make the ratio between the two crystals completely 1:1. However, when the ratio of one crystal (e.g., second crystal) to the other crystal (e.g., first crystal) falls within the range of 0.8 to 1.25, the ratio between the two crystals can be regarded substantially 1:1. Thus, it is particularly preferable to make the ratio of one crystal to the other crystal fall within the above range.

The first and second crystals each have a structure almost the same as the single crystal structure; however, when the structures thereof are each too close to a perfect single crystal structure, cracks are likely to occur in the dielectric thin film 3. Thus, the full width at half maximum of the rocking curve of lithium niobate (006) reflection measured by the X-ray diffraction method preferably falls within the range of 0.3° to 0.6°. When the full width at half maximum of the rocking curve of lithium niobate (006) reflection falls within this range, the first and second crystals each can be almost regarded as a single crystal from the optical point of view and, at the same time, the occurrence of cracks can be suppressed.

The first and second crystals are preferably bonded to each other not through a grain boundary. When the grain boundary exists between the first and second crystals, light scattering occurs in the boundary surface, resulting in increase in propagation loss when the dielectric thin film-applied substrate 1 is used for an optical modulation element. On the other hand, when no grain boundary exists between the first and second crystals, the first and second crystals have the same refractive index, so that the light scattering does not occur, whereby optical characteristics equivalent to those obtained when the first and second crystals each have the single crystal structure can be obtained.

As described above, the dielectric thin film 3 can be formed by epitaxial growth on the main surface 2a of the single crystal substrate 2. Film deposition conditions for the dielectric thin film 3 are not particularly limited; however, in order to form an epitaxial film having the above features, it is preferable to coaxially dispose a target and the single crystal substrate 2 using a sputtering device and to control the film deposition rate at 300 nm/h to 1800 nm/h. In Non-Patent Document 1, a film having a structure close to the single crystal structure is realized by reducing the film deposition rate (90 nm/h); on the other hand, in the present embodiment, the film deposition rate is intentionally increased to form the crack-free dielectric thin film 3 having the twin crystal structure and a film thickness of 1 µm or greater. In order to increase the film deposition rate, methods including increasing application power during sputtering and reducing the distance between the target and the single crystal substrate 2 can be taken.

However, the film deposition method used for the dielectric thin film 3 is not particularly limited and, in addition to the sputtering method, a vacuum vapor deposition method, a pulse laser ablation deposition (PLD) method, a chemical vapor deposition (CVD) method, and a sol-gel method may be used. However, the sputtering method is advantageous in that a single-domain polarization structure can be obtained while the film is being formed without special treatment being applied after the film formation. This is because heat (450° C. to 700° C.) applied during the sputtering and an electric field generated by self-bias serve as polarization processing. When polarization is distributed, electro-optic effect may be degraded; however, when the dielectric thin film 3 is formed into the single-domain structure, the same electro-optic coefficient as obtained in the single crystal structure can be obtained.

When the sputtering method is used as the film deposition method for the dielectric thin film 3, the composition of the target is so determined to have an aimed film composition. For example, a target having a composition of Li/(Li+Nb) =48% to 51% is used, followed by adjustment of film deposition conditions, whereby a lithium niobate film having a composition of Li/(Li+Nb)=48% to 50% can be obtained. Specifically, a lithium niobate target produced by sintering with $Li_2CO_3$ and $Nb_2O_5$ having a purity of 3N or higher used as main raw materials can be used. The shape of the target is not particularly limited; however, in order to sufficiently reduce film thickness distribution, the planar size of the target is preferably about twice or more that of the single crystal substrate 2. The film deposition may be performed under a single condition (single step), or may be changed in the middle (multistep).

Next, application examples of the dielectric thin film-applied substrate 1 according to the present embodiment will be described.

Application Example 1

Figure 2:
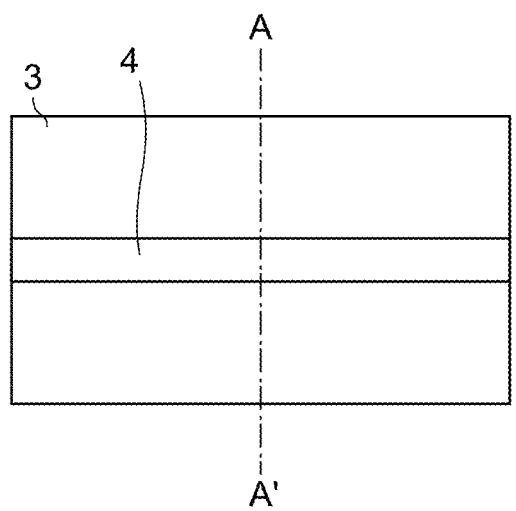
FIG. 2 is a plan view illustrating the configuration of an optical waveguide element 100 using the dielectric thin film-applied substrate 1.
Figure 3:
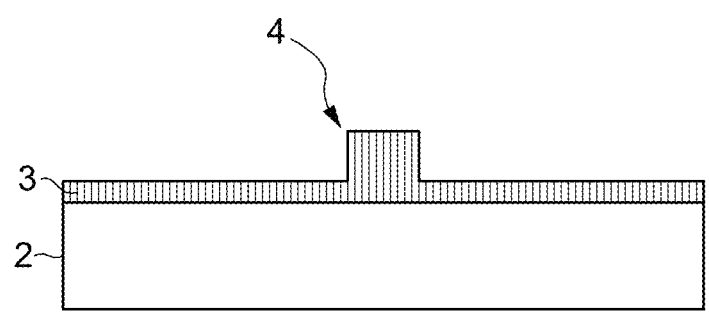
FIG. 3 is a cross-sectional view of the optical waveguide element 100 taken along line A-A' of FIG. 2.

FIG. 2 is a plan view illustrating the configuration of an optical waveguide element 100 using the dielectric thin film-applied substrate 1. FIG. 3 is a cross-sectional view of the optical waveguide element 100 taken along line A-A' of FIG. 2.

The optical waveguide element 100 illustrated in FIGS. 2 and 3 has a configuration in which the dielectric thin film 3 included in the dielectric thin film-applied substrate 1 is processed in a ridge shape. A ridge 4 is a part where target light propagates in a TM fundamental mode. In order to produce the thus configured optical waveguide element 100, the dielectric thin film-applied substrate 1 is prepared, and the dielectric thin film 3 is etched to form the ridge 4. Further, in the dielectric thin film-applied substrate 1 according to the present embodiment, the film thickness of the dielectric thin film 3 is as large as or greater than e.g., 1 µm, so that propagation loss in the TM fundamental mode can be reduced.

Application Example 2

Figure 4:
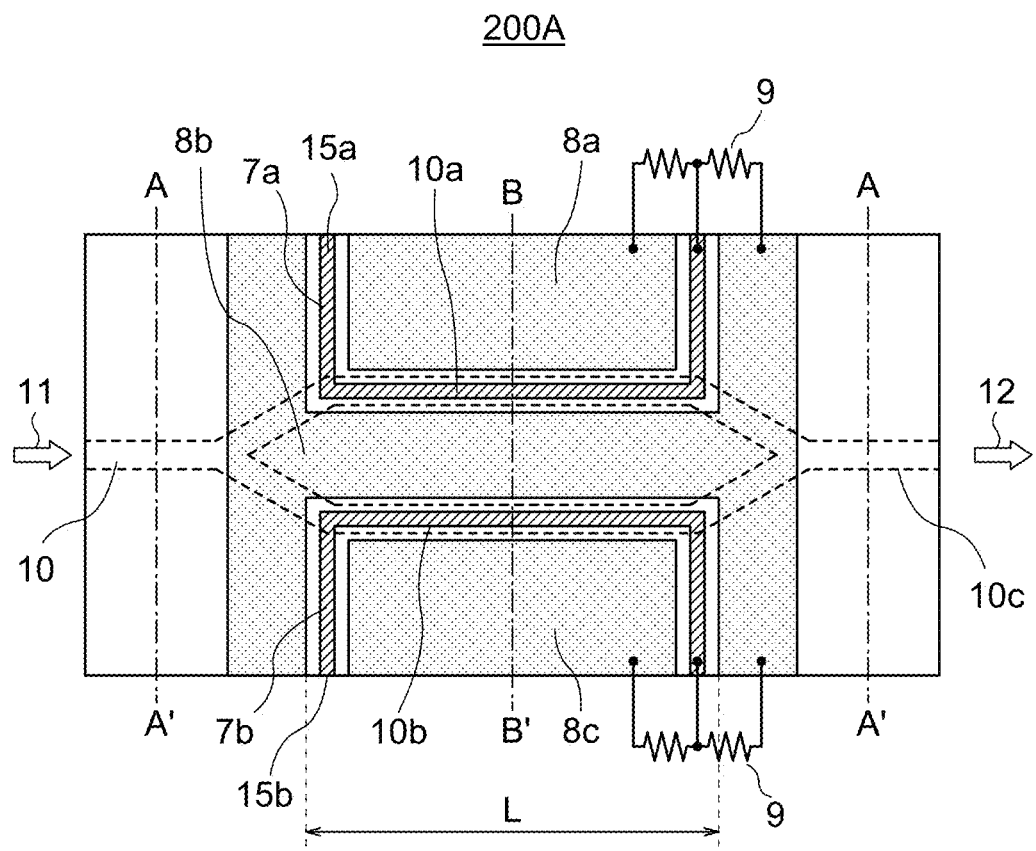
FIG. 4 is a plan view of a Mach-Zehnder optical modulation element 200A using the dielectric thin film-applied substrate 1.

FIG. 4 is a plan view of a Mach-Zehnder optical modulation element 200A using the dielectric thin film-applied substrate 1. The optical modulation element 200A is a device that applies voltage to a Mach-Zehnder interferometer formed by an optical waveguide 10 to modulate light propagating in the optical waveguide 10. The optical waveguide 10 is branched into two optical waveguides 10a and 10b. Two first electrodes 7a and 7b are provided on the optical waveguides 10a and 10b, respectively, to form a dual electrode structure.

Figure 5:
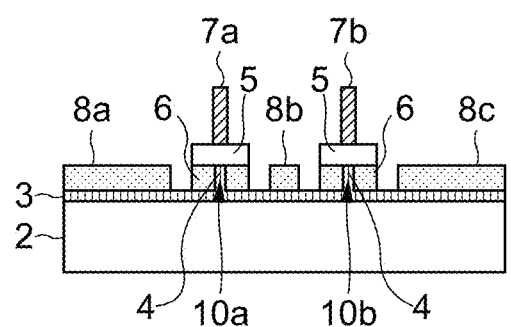
FIG. 5 is a cross-sectional view of the optical modulation element 200A taken along B-B' line of FIG. 4.

FIG. 5 is a cross-sectional view of the optical modulation element 200A taken along B-B' line of FIG. 4. The cross-sectional view of the optical modulation element 200A taken along line A-A' corresponds to the cross-sectional view of the optical waveguide element 100 illustrated in FIG. 3. In the present embodiment, the optical waveguides 10a and 10b are formed respectively by two ridges 4 provided on the dielectric thin film 3. The first electrode 7a is formed on the ridge 4 constituting the optical waveguide 10a through a buffer layer 5, and the first electrode 7b is formed on the ridge 4 constituting the optical waveguide 10b through the buffer layer 5. Second electrodes 8a, 8b, and 8c are provided so as to be spaced from one another through the first electrodes 7a and 7b and to contact the upper surface of a slab portion (etched thin portion) of the dielectric thin film 3. A dielectric layer 6 is formed so as to contact the lower surface of the buffer layer 5 and the side surface of the ridge 4.

The principle of operation of the optical modulation element 200A will be described. In FIG. 4, the two first electrodes 7a and 7b and second electrodes 8a, 8b, and 8c are connected by terminal resistors 9 to make them function as a traveling-wave electrode. The second electrodes 8a, 8b, and 8c are used as ground electrodes, and complementary positive and negative signals having the same absolute value and the same phase are input respectively to the two first electrodes 7a and 7b through inputs 15a and 15b of the first electrodes 7a and 7b of the optical modulation element 200A. Since the lithium niobate film has electro-optic effect, the electric field applied to the optical waveguides 10a and 10b changes the refractive indices of the optical waveguides 10a and 10b by +Δn and −Δn, respectively, whereby a phase difference between the optical waveguides 10a and 10b is changed. The change in the phase difference allows intensity-modulated signal light to be output to an output 12 through an exit side waveguide 10c of the optical modulation element 200A.

Application Example 3

Figure 6A:
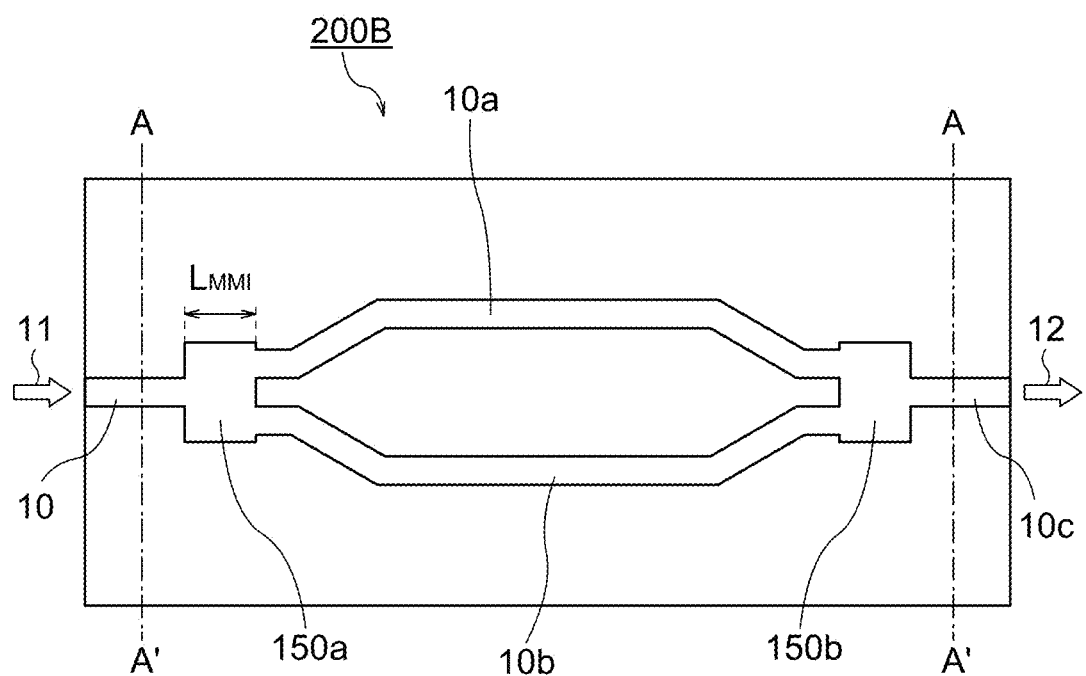
Figure 6B:
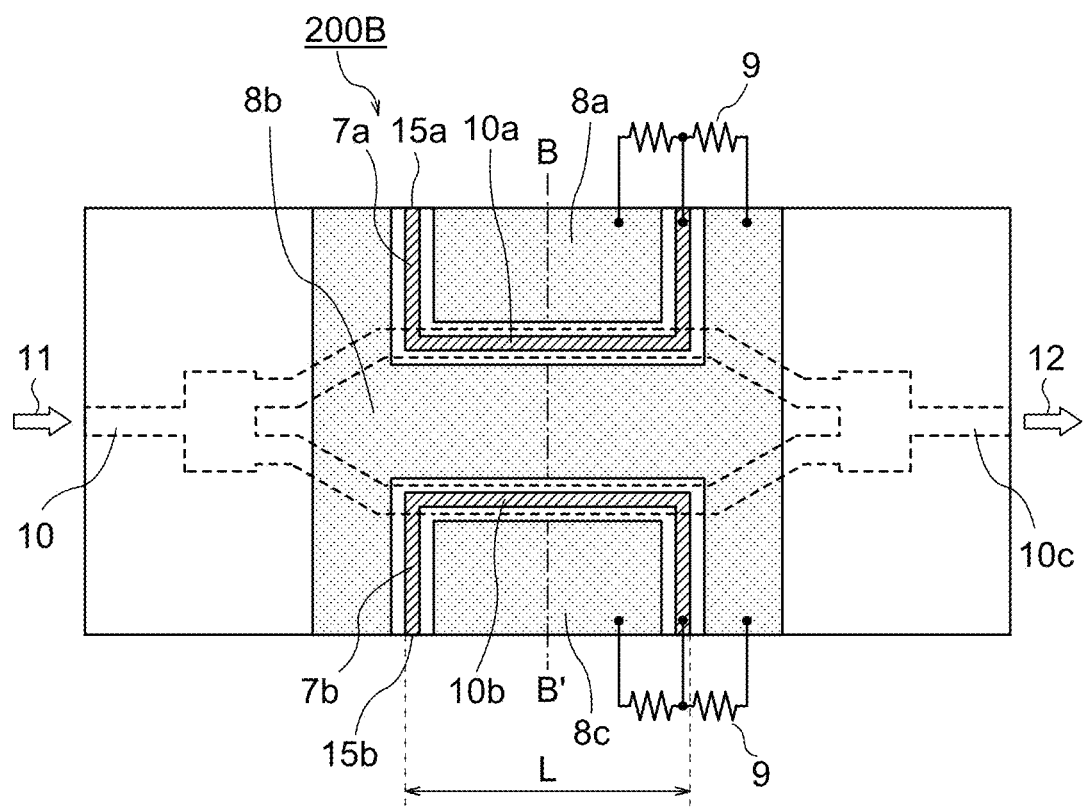

FIGS. 6A and 6B are plan views each illustrating a Mach-Zehnder optical modulation element 200B using the dielectric thin film-applied substrate 1. FIG. 6A illustrates only the optical waveguides, and FIG. 6B illustrates the entire configuration of the optical modulation element 200B including the traveling-wave electrode.

As illustrated in FIG. 6A, in the optical modulation element 200B, the optical waveguide 10 is branched into optical waveguides 10a and 10b by a multimode interference branching waveguide 150a and then merged into an optical waveguide 10c by a multimode interference branching waveguide 150b to constitute a Mach-Zehnder interferometer. As illustrated in FIG. 6B, two first electrodes 7a and 7b are provided on the optical waveguides 10a and 10b, respectively, to form a dual electrode structure. The optical modulation element 200B is a device that applies voltage to the Mach-Zehnder interferometer formed by the optical waveguide 10 to modulate light propagating in the optical waveguide 10. The cross-sectional view of the optical modulation element 200B taken along line A-A' corresponds to the cross-sectional view of FIG. 3, and the cross-sectional view of the optical modulation element 200B taken along line B-B' corresponds to the cross-sectional view of FIG. 5.

Figure 7:
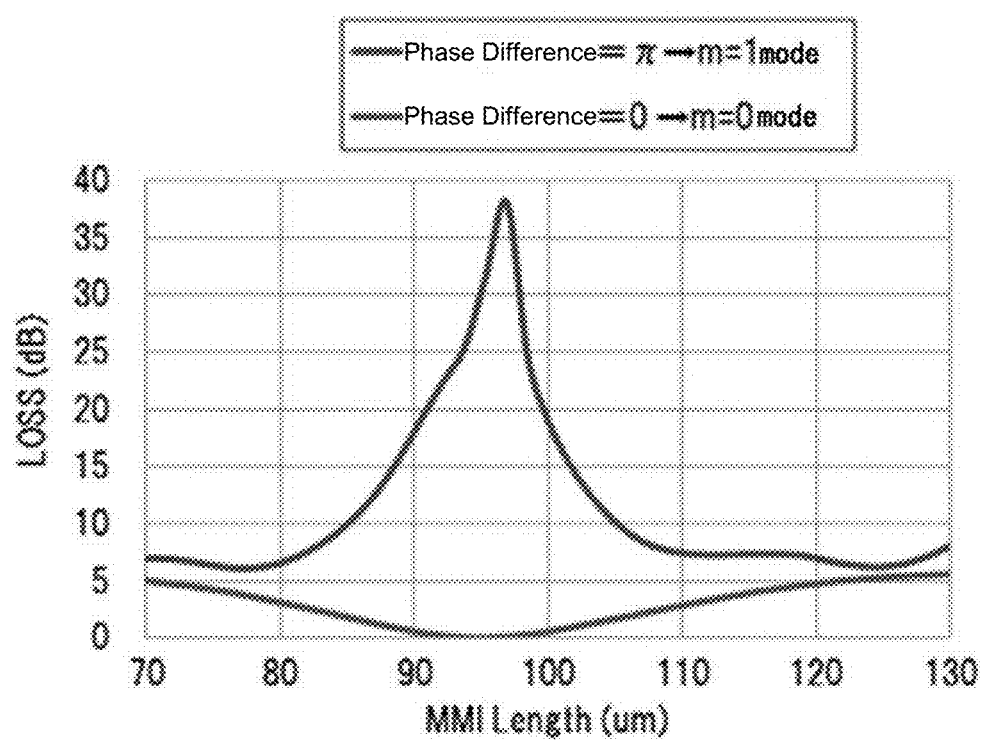
FIG. 7 is a graph illustrating an example of the characteristics of the multimode interference branching waveguides 150a and 150b.

The multimode interference branching waveguides 150a and 150b each have characteristics in which propagation loss for an m=1 mode is larger than propagation loss for m=0 mode. FIG. 7 is a graph illustrating an example of the characteristics of the multimode interference branching waveguides 150a and 150b. The horizontal axis indicates a length $L_{NM1}$ of each of the multimode interference branching waveguides 150a and 150b, and the vertical axis indicates a signal attenuation amount. As illustrated in FIG. 7, setting the length $L_{NM1}$ of each of the multimode interference branching waveguides 150a and 150b to a predetermined length allows the component of the m=1 mode to be significantly attenuated without hardly attenuating the component of the m=0 mode. This can be realized by setting the length $L_{NM1}$ to about 97 μm in the example of FIG. 7.

Thus, when the thus configured multimode interference branched waveguides 150a and 150b are used, the m=0 mode component out of light entering from the optical waveguide 10 in FIG. 6A is demultiplexed to the optical waveguides 10a and 10b without being attenuated, while the m=1 mode component is attenuated by the multimode interference branching waveguide 150a and is hardly output from the optical waveguides 10a and 10b. Therefore, even the multimode waveguide through which the TM m=0 and m=1 modes propagate can be treated virtually as a single mode waveguide.

Application Example 4

Figure 8A:
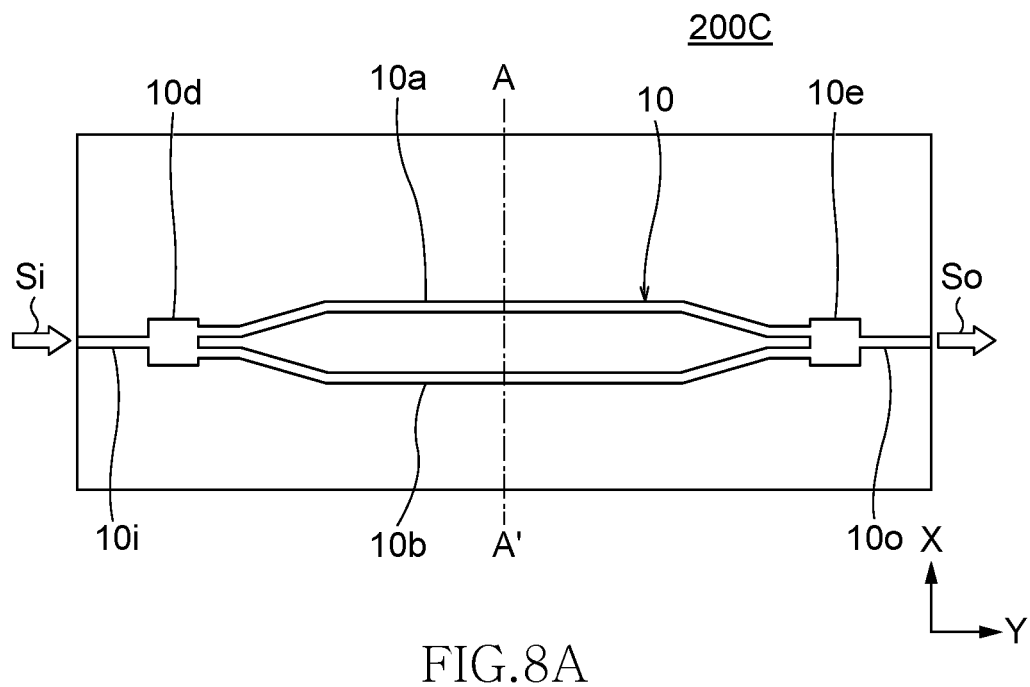
Figure 8B:
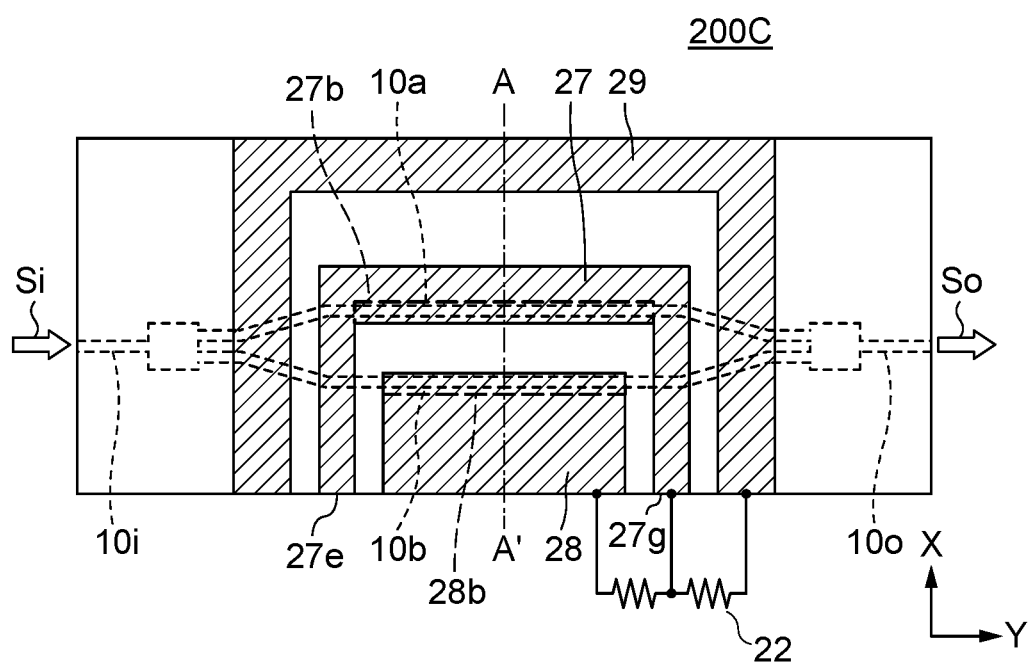

FIGS. 8A and 8B are plan views each illustrating a Mach-Zehnder optical modulation element 200C using the dielectric thin film-applied substrate 1. FIG. 8A illustrates only the optical waveguides, and FIG. 8B illustrates the entire configuration of the optical modulation element 200C including the traveling-wave electrode.

As illustrated in FIGS. 8A and 8B, the optical modulation element 200C includes a Mach-Zehnder optical waveguide 10 having first and second optical waveguides 10a and 10b provided in parallel to each other, a signal electrode 27 provided along the first optical waveguide 10a, a first ground electrode 28 provided along the second optical waveguide 10b, and a second ground electrode 29 provided on the side opposite to the first ground electrode 28 with respect to the signal electrode 27.

The Mach-Zehnder optical waveguide 10 is an optical waveguide having the structure of a Mach-Zehnder interferometer. A single input optical waveguide 10i is branched into the first and second optical waveguides 10a and 10b by a demultiplexing part 10d, and the first and second optical waveguides 10a and 10b are merged into a single output optical waveguide 10o through a multiplexing part 10e. Input light Si is demultiplexed by the demultiplexing part 10d. The demultiplexed signals travel through the first and second optical waveguides 10a and 10b, respectively, and multiplexed by the multiplexing part 10e. The multiplexed signal is then output from the output optical waveguide 10o as a modulation signal So.

The signal electrode 27 is positioned between the first and second ground electrodes 28 and 29 in a plan view. One end 27e of the signal electrode 27 serves as a signal input end, and the other end 27g thereof is connected to the first and second ground electrodes 28 and 29 through a terminal resistor 22. As a result, the signal electrode 27 and first and second ground electrodes 28 and 29 function as a coplanar type traveling-wave electrode. The signal electrode 27 and the first ground electrode 28 each have a two-layer structure. A lower layer part 27b (denoted by the dashed line) of the signal electrode 27 overlaps the first optical waveguide 10a in a plan view, and a lower layer part 28b (denoted by the dashed line) of the first ground electrode 28 overlaps the second optical waveguide 10b in a plan view.

An electrical signal (modulation signal) is input to the one end 27e of the signal electrode 27. The first and second optical waveguides 10a and 10b are each made of a material, such as lithium niobate, having electro-optic effect, so that electric field applied to the first and second optical waveguides 10a and 10b changes the refractive indices of the optical waveguides 10a and 10b by +Δn and −Δn, respectively, whereby a phase difference between the pair of optical waveguides is changed. The change in the phase difference allows modulated signal light to be output from the output optical waveguide 10o.

As described above, the optical modulation element 200C according to the present embodiment is of a single-drive type constituted by one signal electrode 27, so that a sufficient area can be ensured for the first ground electrode 28, allowing high-frequency operation. Further, the second ground electrode 29 is disposed on the side opposite to the first ground electrode 28 with respect to the signal electrode 27, so that radiation loss can be reduced and, thus, more satisfactory high-frequency characteristics can be obtained.

As described above, by using the dielectric thin film-applied substrate 1 according to the present embodiment, it is possible to produce high-quality optical waveguide and optical modulation element.

While the preferred embodiments of the present invention have been described, the present invention is not limited to the above embodiments, and various modifications may be made within the scope of the present invention. Accordingly, all such modifications are included in the present invention.

Example 1

A sputtering device was used to actually epitaxially grow a dielectric thin film made of lithium niobate on a sapphire single crystal substrate. As a target, a lithium niobate sintered body produced by sintering with $Li_2CO_3$ and $Nb_2O_5$ having a purity of 3N or higher used as main raw materials and having a composition of Li/(Li+Nb)=50% was used. In the production of the target, a $ZrO_2$ ball mill having high abrasion resistance was used to pulverize and blend the sintered body made of a powder material. At the time of pulverization, the ball mill was scraped, and Zr of about several hundred ppm was mixed into the target powder material. Epitaxial growth can be achieved also in the lithium niobate film deposited in the lithium niobate target mixed with the small amount of Zr, and no problem occurs.

The size of the target was set to 6 inch, and the distance between the sapphire single crystal substrate and the target was set to 90 mm. As the sapphire single crystal substrate, a 3-inch sapphire single crystal substrate whose main surface facing the target is a c-surface was used. The sapphire single crystal substrate and target were disposed coaxially.

Mixture gas of Ar and $O_2$ was used as sputter gas, wherein the ratio of $O_2$ to Ar was set in the range of 20% to 50%, and the gas pressure was set to 0.6 Pa. Under these conditions, sputtering was performed by application of 900 W power. The temperature of the sapphire single crystal substrate was set in the range of 450° C. to 700° C. and was changed for each sample. 13 samples were prepared. Film deposition conditions were not changed in the middle, that is, film deposition was performed in a single step.

As a result, a lithium niobate film having a film thickness of 1100 nm to 1900 nm and having a c-axis oriented twin crystal structure was epitaxially formed on the main surface of the sapphire single crystal substrate. The film deposition rate was in the range of 500 nm/h to 600 nm/h. The result of evaluation of the presence/absence of crack for 13 samples confirmed that no crack occurred in all the 13 samples, and crack-free lithium niobate films were obtained.

Then, Raman spectroscopy was used to estimate the Li ratio of the deposited lithium niobate film. The reason for the use of Raman spectroscopy is to allow the evaluation to be performed in a nondestructive manner and that it is difficult to analyze the Li accurately by chemical analysis. The half-value width of the peak of the Raman changes substantially proportionally to the Li ratio, so that the Li ratio of the film was estimated by comparison with two kinds of lithium niobate single crystals (Li ratio: 48.5%, 50%) with different compositions. As a result, the Li ratio of the film fell within the range of 47.5% to 49.8% depending on the film deposition conditions. This confirmed that the crystalline structure of the lithium niobate film was a single phase of $LiNbO_3$ not inclusive of a hetero-phase.

Then, pole figure measurement by an X-ray diffraction method was performed to measure the first diffraction intensity corresponding to the first crystal of lithium niobate and the second diffraction intensity corresponding to the second crystal thereof. As a result, the ratio between the first and second diffraction intensities fell within the range of 0.8 to 1.25 depending on the film deposition conditions. The full width at half maximum of the rocking curve of lithium niobate (006) reflection fell within the range of 0.3° to 0.6°.

Figure 9B:
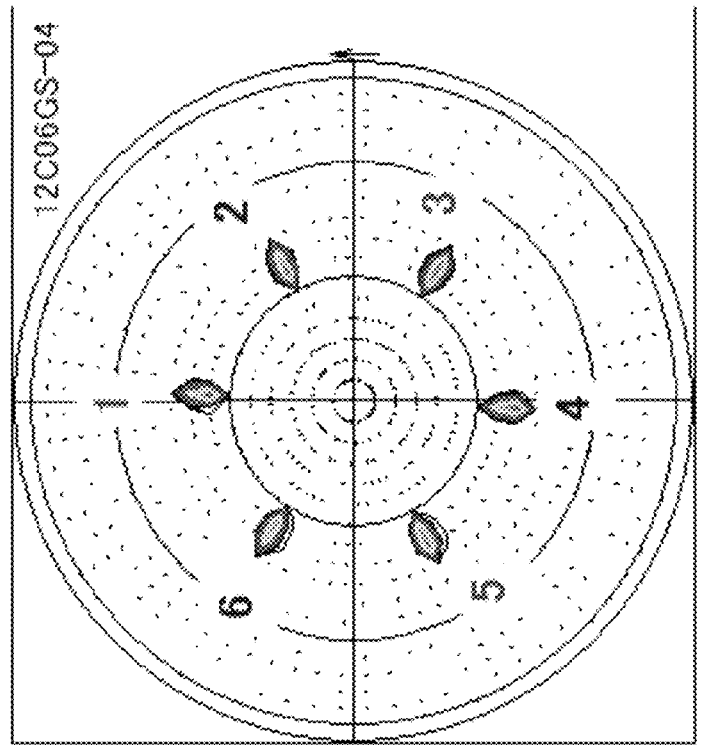
Figure 9A:
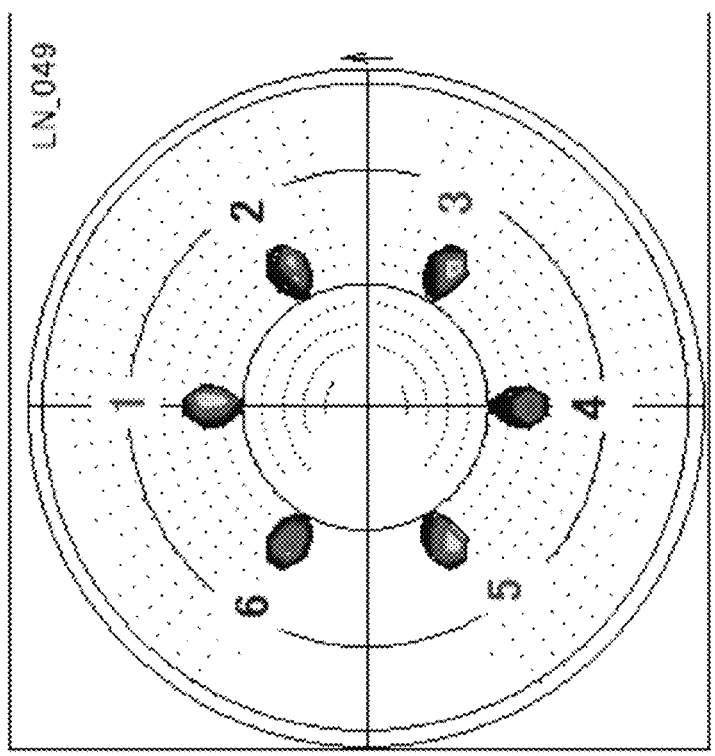

FIGS. 9A and 9B are views illustrating the results of the pole figure measurement by the X-ray diffraction method. FIG. 9A is the result obtained in a comparative example, and FIG. 9B is the result obtained in an example. In the comparative example, the gas pressure was set to 4 Pa, power was set to 180 W, and the film thickness was set to 1100 nm. In this case, the film deposition rate was 90 nm/h.

As illustrated in FIG. 9A, in the comparative example, there was a clear difference between the intensity of each of poles 1, 3, and 5 representing the first crystal and the intensity of each of poles 2, 4, and 6 representing the second crystal, and the former was stronger than the latter. The ratio of the second diffraction intensity to the first diffraction intensity (second diffraction intensity/first diffraction intensity) was 0.45. Further, cracks existed in the lithium niobate film. When film deposition was performed while changing the $O_2$ gas ratio and substrate temperature with the gas pressure and power set to 4 Pa and 180 W, respectively, a crack-free film was successfully obtained with a film thickness of 900 nm or smaller, but was not obtained with a film thickness of 1100 nm or larger.

On the other hand, as illustrated in FIG. 9B, in a predetermined sample according to the example, the intensity of each of poles 1, 3, and 5 representing the first crystal and the intensity of each of poles 2, 4, and 6 representing the second crystal were substantially the same, and the ratio of the second diffraction intensity to the first diffraction intensity (second diffraction intensity/first diffraction intensity) was 0.99. Further, no crack existed in the lithium niobate film.

Figure 10:
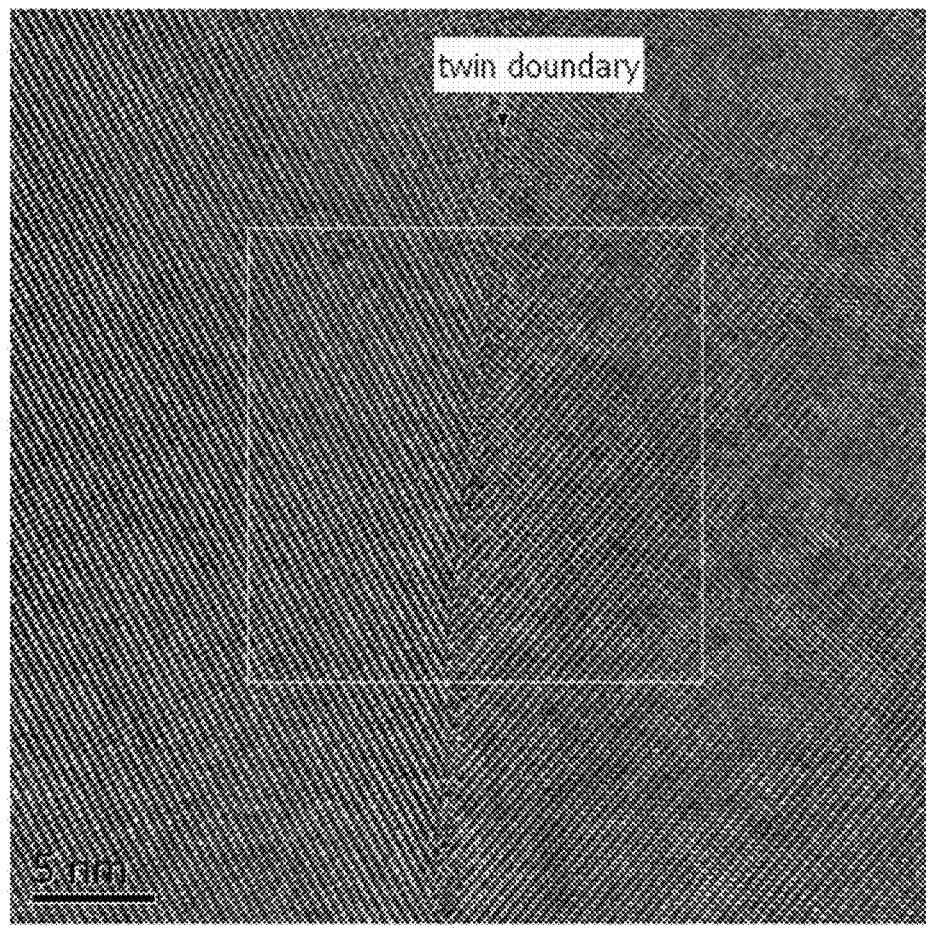
FIG. 10 is a photograph showing the surface of the lithium niobate film which is observed through a high resolution transmission electronic microscope.

Then, a high-resolution transmission electronic microscope (HRTEM image) was used to observe the surface of the lithium niobate film according to a predetermined sample of the example. The result is illustrated in FIG. 10. As illustrated in FIG. 10, although two kinds of crystals were clearly observed, an interface layer such as a grain boundary did not exist therebetween.

Then, a scanning nonlinear dielectric microscope (SNDM) was used to observe the polarization distribution of a dielectric body of each sample according to the example at a nano scale. Each sample was observed to have uniform polarization direction and thus has a single-domain structure.

Figure 11:
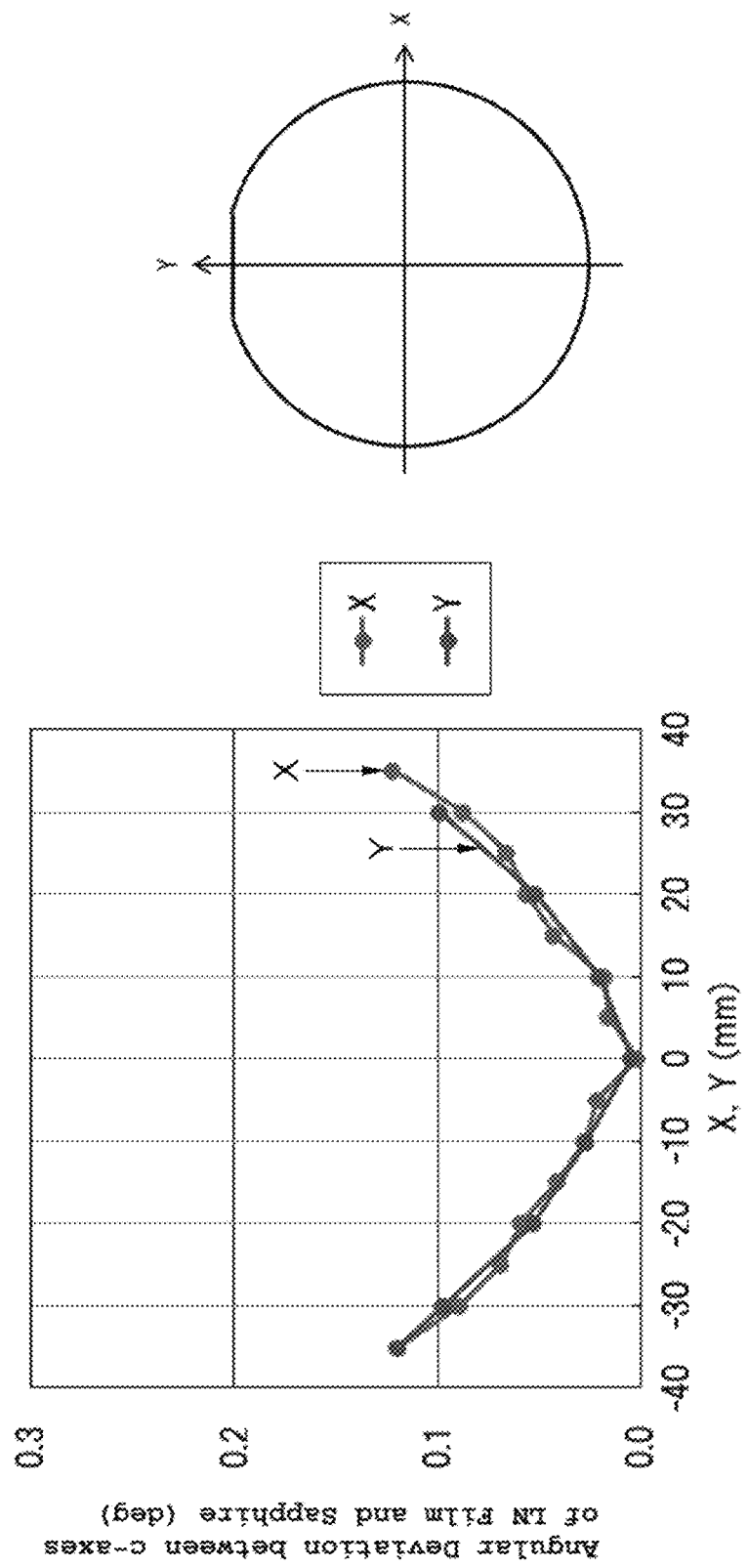
FIG. 11 is a view illustrating angular deviation between c-axes of a sapphire single crystal substrate and the lithium niobate film.

Then, the angular deviation between the c-axes of the sapphire single crystal substrate and lithium niobate film was evaluated for a predetermined sample of the example. The result is illustrated in FIG. 11. As illustrated in FIG. 11, the deviation between the c-axes of the sapphire single crystal substrate and lithium niobate film became larger toward the outer periphery, but was about 0.12° at the maximum. That is, the c-axes substantially coincided with each other.

Then, a sample of the example having no crack was used to actually produce an optical modulation element, and drive voltage was evaluated to calculate electro-optic characteristics. The electro-optic coefficient r33 was about 30 pm/V, that is, the characteristics equivalent to those of the $LiNbO_3$ single crystal was obtained. Further, the refractive index of the lithium niobate film was measured by a prism coupler method. As a result, the refractive index at a wavelength of 632.8 nm was no=2.288±0.01, ne=2.200±0.01, that is, the characteristics equivalent to those of a single crystal was obtained. Further, the propagation loss of the lithium niobate film was measured by the prism coupler method. As a result, the propagation loss was less than 1 dB/cm which is the limit of the measurement accuracy. That is, scattering loss did not occur even in the twin crystal structure.

As described above, although the lithium niobate film according to the example has the twin crystal structure, it has practically the same characteristics as those of the single crystal.

Example 2

After epitaxially growing a lithium niobate film of 800 nm to 2000 nm on the main surface of the sapphire single crystal substrate under the same conditions as those of Example 1, an optical modulation element was actually produced, and the relationship between the film thickness of the lithium niobate film and $V\pi L$ was measured. The measurement wavelength was set to 1550 nm which is the value used in an optical communication system. The $V\pi$ is a half-wavelength voltage which is defined by the difference between a voltage value at which optical output becomes maximum and a voltage value at which it becomes minimum and means the drive voltage. The L is the length of an electrode on the waveguide. The $V\pi$ and L are in inverse proportion to each other. For example, assuming that the product value of the $V\pi$ and L is maintained at the same value, when the L is doubled, the $V\pi$ is halved. Thus, the $V\pi L$ which is the product of $V\pi$ and L is an important index representing the performance of an optical modulator. An optical modulator having a smaller $V\pi L$ has a smaller size or a lower drive voltage.

Figure 12:
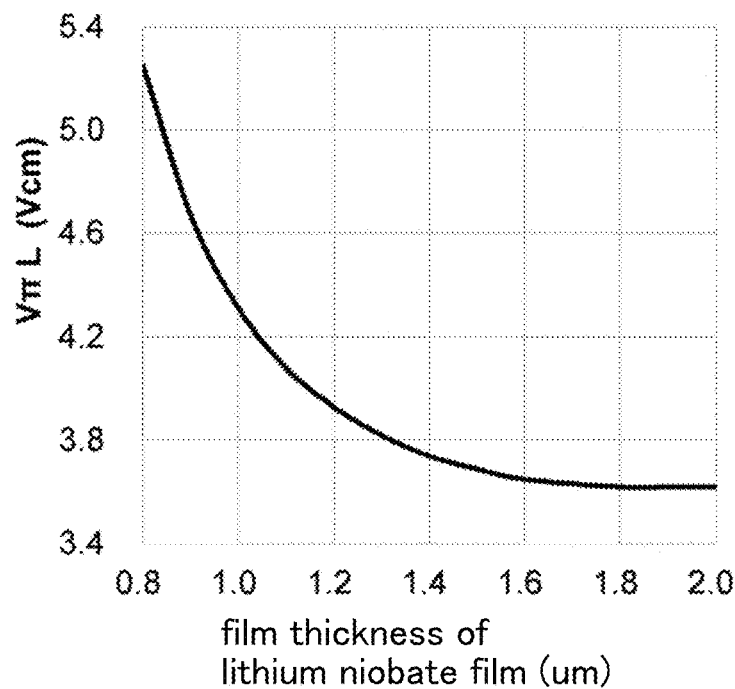
FIG. 12 is a graph illustrating the relationship between the film thickness of the lithium niobate film and $V\pi L$.
Figure 13:
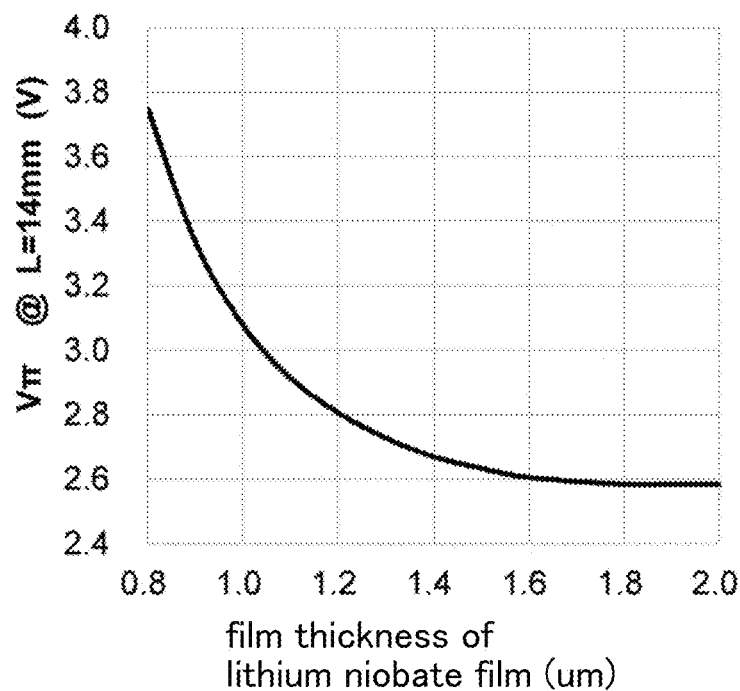
FIG. 13 is a graph illustrating the relationship between the film thickness of the lithium niobate film and $V\pi$ when an electrode length L=14 mm.

The relationship between the film thickness of the lithium niobate film and $V\pi L$ is illustrated in FIG. 12. The relationship between the film thickness of the lithium niobate film and $V\pi$ when the electrode length L=14 mm is illustrated in FIG. 13. The reason that the electrode length L is set to 14 mm is to ensure high frequency characteristics.

As illustrated in FIGS. 12 and 13, as the film thickness of the lithium niobate film is increased, the $V\pi L$ and $V\pi$ rapidly fall. This is because when the film thickness is small, light confining force into the lithium niobate film is weakened, effectively reducing the electro-optic effect. As practical characteristics, the half-wavelength voltage $V\pi$ needs to be 3 V or lower and, in order to satisfy this, the film thickness of the lithium niobate film needs to be 1 µm or larger.

However, when the film thickness of the lithium niobate film increases to a fixed value or larger, the $V\pi L$ and $V\pi$ are saturated to stop enhancement of the effect. Specifically, the $V\pi L$ and $V\pi$ do not change so much when the film thickness of the lithium niobate film is about 1300 nm and are almost saturated when the film thickness of the lithium niobate film is about 1600 nm. Thus, by setting the film thickness of the lithium niobate film to 1300 nm or larger, an optical modulation element having satisfactory characteristics can be obtained and, by setting the film thickness of the lithium niobate film to 1600 nm or larger, an optical modulation element having the most favorable characteristics can be obtained.

Example 3

A sample obtained by setting the substrate temperature of the sapphire single crystal substrate to 550° C. under the conditions of Example 1 was used as sample A, a sample obtained by setting the power, gas pressure, and substrate temperature to 180 W, 4 Pa, and 550° C. was used as sample B, and a sample obtained by setting the power, gas pressure, and substrate temperature to 180 W, 0.6 Pa, and 650° C. was used as sample C. For each of the samples A and B, a plurality of samples was produced with a film thickness of the lithium niobate film set in the range of 700 nm to 1900 nm. For the sample C, a plurality of samples was produced with a film thickness of the lithium niobate film set in the range of 700 nm to 1300 nm.

Then, pole figure measurement by an X-ray diffraction method was performed to measure the first diffraction intensity corresponding to the first crystal of the lithium niobate and the second diffraction intensity corresponding to the second crystal thereof. As a result, the ratio between the first and second diffraction intensities (weaker diffraction intensity/stronger diffraction intensity) was 0.99, 0.45, and 0.20 in the samples A, B, and C, respectively.

Figure 14:
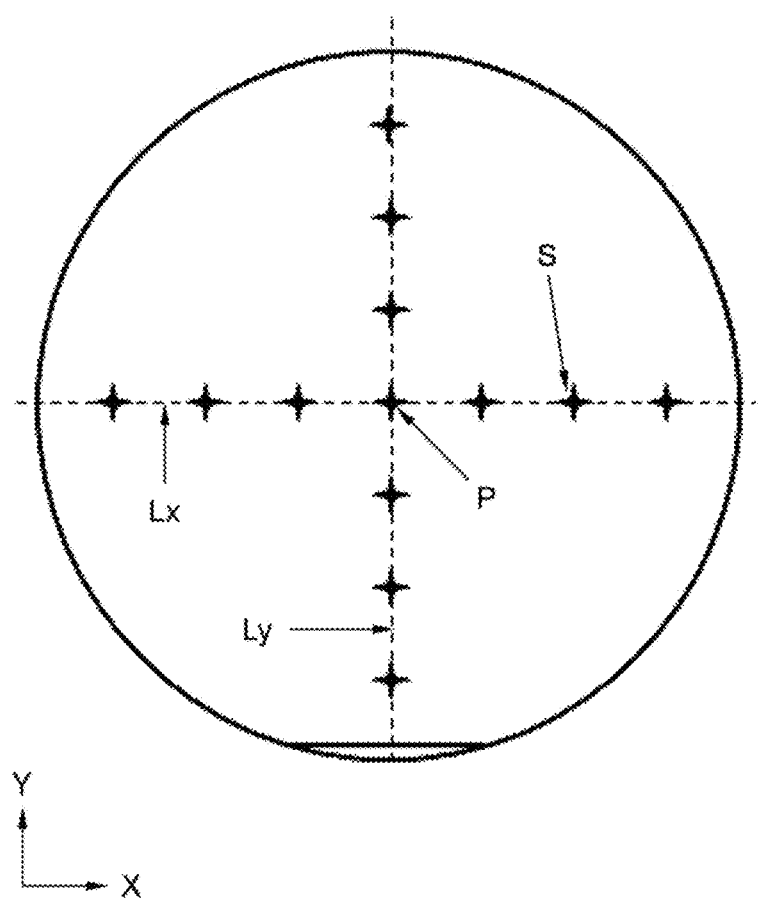
FIG. 14 is a schematic view for explaining the positions of measurement regions S.

Then, as illustrated in FIG. 14, virtual lines Lx and Ly were defined in the X- and Y-directions with a center point P of each sample as a reference, and measurement regions S were assigned at 10 mm interval along the virtual lines Lx and Ly starting from the center point P. The number of the measurement regions S was 13 in total. An optical microscope was used to observe the presence/absence of cracks for each measurement region S. The magnitude of an objective lens was set to 20× to 100×, and whether or not a crack having a length of 10 µm or larger exists in the visual field was evaluated. The observation was performed after the elapse of 72 hours or more after film deposition of the lithium niobate film. This is because a crack that is not present immediately after the film deposition may be generated with the lapse of time. Under the microscope used by the present inventors, the diameter of visual field was about 0.5 mm when the magnification of the objective lens was 20× and about 0.1 mm when the magnification of the objective lens was 100×.

The result is illustrated in FIG. 15. The number shown in the table of FIG. 15 indicates the number of the measurement regions S where crack was present, the parenthesized numeric value indicates the percentage of the measurement regions S where crack was present. As illustrated in FIG. 15, in the sample A in which the ratio between the first and second diffraction intensities is 0.99, the number of the measurement regions S where crack was present was 0 (0%) in the thickness range of the lithium niobate film between 70 nm and 1900 nm.

On the other hand, in the sample B in which the ratio between the first and second diffraction intensities is 0.45, the number of cracks was larger as the film thickness of the lithium niobate film was greater. Specifically, the number of the measurement regions S where crack is present is 0 (0%) when the film thickness was 700 nm and 900 nm; however, the number of the measurement regions S where crack was present was 5 (38%) when the film thickness was 1100 nm, the number of the measurement regions S where crack was present was 9 (69%) when the film thickness was 1300 nm and 1500 nm, and the number of the measurement regions S where crack was present was 13 (100%) when the film thickness was 1700 nm and 1900 nm. As described above, when the film thickness of the lithium niobate film is 1000 nm or greater, the percentage of the measurement regions S where crack is present exceeds 30%.

Also in the sample C in which the ratio between the first and second diffraction intensities is 0.20, the number of cracks was larger as the film thickness of the lithium niobate film was greater. Specifically, the number of the measurement regions S where crack was present was 5 (38%) when the film thickness was 700 nm, the number of the measurement regions S where crack was present was 9 (69%) when the film thickness was 900 nm, and the number of the measurement regions S where crack was present was 13 (100%) when the film thickness was 1100 nm and 1300 nm. As described above, when the film thickness of the lithium niobate film is 1000 nm or greater, the percentage of the measurement regions S where crack is present reaches 100%.

As a result, it can be confirmed that the percentage of the measurement regions S where crack is present can be reduced to 30% or less even when the film thickness of the lithium niobate film is 1000 nm or greater, as long as the ratio between the first and second diffraction intensities is close to 1.

REFERENCE SIGNS LIST 1 dielectric thin film-applied substrate
2 single crystal substrate
2a main surface
3 dielectric thin film
4 ridge
5 buffer layer
6 dielectric layer
7a, 7b, 8a-8c electrode
9 terminal resistor
10, 10a-10c optical waveguide
10d demultiplexing part
10e multiplexing part
10i input optical waveguide
10o output optical waveguide
12 output
15a, 15b input
22 terminal resistor
27 signal electrode
27b lower layer part
27e one end
27g the other end
28, 29 ground electrode
28b lower layer part
100 optical waveguide element
150, 150a, 150b multimode interference branching waveguide
200A, 200B, 200C optical modulation element
Lx, Ly virtual line
P center point
S measurement region

What is claimed is:

1. A dielectric thin film-applied substrate comprising:
a single crystal substrate; and
a dielectric thin film which is made of c-axis oriented lithium niobate and epitaxially formed on a main surface of the single crystal substrate, wherein
the film thickness of the dielectric thin film is at least 1000 nm,
the dielectric thin film has a twin crystal structure including a first crystal and a second crystal existing at a position obtained by rotating the first crystal 180° centered on the c-axis, and
in pole figure measurement by an X-ray diffraction method, the ratio between a first diffraction intensity corresponding to the first crystal and a second diffraction intensity corresponding to the second crystal is equal to or higher than 0.5 and equal to or lower than 2.0.

2. The dielectric thin film-applied substrate as claimed in claim 1, wherein in the pole figure measurement by the X-ray diffraction method, the ratio between the first diffraction intensity and the second diffraction intensity is equal to or higher than 0.8 and equal to or lower than 1.25.

3. The dielectric thin film-applied substrate as claimed in claim 1, wherein the single crystal substrate is a sapphire single crystal substrate whose main surface is a c-surface.

4. The dielectric thin film-applied substrate as claimed in claim 1, wherein the full width at half maximum of the rocking curve of lithium niobate (006) reflection measured by the X-ray diffraction method is equal to or higher than 0.3° and equal to or lower than 0.6°.

5. The dielectric thin film-applied substrate as claimed in claim 1, wherein a grain boundary does not exist between the first and second crystals.

6. The dielectric thin film-applied substrate as claimed in claim 1, wherein the film thickness of the lithium niobate film is at least 1300 nm.

7. An optical modulation element using the dielectric thin film-applied substrate as claimed in claim 1.

8. A dielectric thin film-applied substrate comprising:
a sapphire single crystal substrate; and
a dielectric thin film which is made of c-axis oriented lithium niobate and epitaxially formed on a main surface of the sapphire single crystal substrate, wherein
the film thickness of the dielectric thin film is equal to or larger than 1000 nm and the percentage of regions where a crack having a length of 10 µm or larger is present to 30% or less,
the dielectric thin film has a twin crystal structure including a first crystal and a second crystal existing at a position obtained by rotating the first crystal 180° centered on the c-axis.

9. The dielectric thin film-applied substrate as claimed in claim 8, wherein a crack having a length greater than or equal to 10 µm does not exist in the dielectric thin film.

* * * * *